June 11, 1963 N. LANE 3,093,335

TAPE RECORDING AND REPRODUCING APPARATUS

Filed Oct. 22, 1959 6 Sheets-Sheet 1

INVENTOR
Norman Lane
BY
Ralph B. Stewart
ATTORNEY

June 11, 1963 N. LANE 3,093,335

TAPE RECORDING AND REPRODUCING APPARATUS

Filed Oct. 22, 1959 6 Sheets-Sheet 2

INVENTOR

Norman Lane

BY

Ralph B. Stewart

ATTORNEY

June 11, 1963 N. LANE 3,093,335

TAPE RECORDING AND REPRODUCING APPARATUS

Filed Oct. 22, 1959 6 Sheets-Sheet 3

INVENTOR

Norman Lane

BY

Ralph B. Stewart

ATTORNEY

June 11, 1963 N. LANE 3,093,335

TAPE RECORDING AND REPRODUCING APPARATUS

Filed Oct. 22, 1959 6 Sheets-Sheet 4

INVENTOR

Norman Lane

BY

Ralph B. Stewart

ATTORNEY

June 11, 1963 N. LANE 3,093,335

TAPE RECORDING AND REPRODUCING APPARATUS

Filed Oct. 22, 1959 6 Sheets-Sheet 5

INVENTOR
Norman Lane
BY
Ralph B. Stewart
ATTORNEY

TAPE RECORDING AND REPRODUCING APPARATUS

Filed Oct. 22, 1959 6 Sheets-Sheet 6

INVENTOR
Norman Lane
BY
Ralph B. Stewart
ATTORNEY

United States Patent Office 3,093,335
Patented June 11, 1963

3,093,335

TAPE RECORDING AND REPRODUCING APPARATUS

Norman Lane, Halesowen, England, assignor to BSR Limited, a company of Great Britain
Filed Oct. 22, 1959, Ser. No. 847,943
Claims priority, application Great Britain Nov. 21, 1958
7 Claims. (Cl. 242—55.12)

The present invention relates to improvements in and relating to sound recording and reproducing apparatus of the kind utilising a magnetic tape movable between two rotatable spools past one or more transducer heads, the drive of the tape during recording and reproducing being effected by the engagement of the tape with a rotary spindle driven at substantially constant speed by the motor of the machine, the tape being held in frictional engagement with the rotary spindle by pressure engagement of an idler roller with the tape.

The spools are mounted for rotation with spool carriers and the pull on the tape by the rotary spindle, usually termed the capstan spindle, is utilised to rotate the carrier of the take-off spool whilst the carrier of the take-on spool is driven from the motor through a slipping clutch in such a manner as to maintain tension on the tape between the take-on spool and the capstan spindle.

It is also usual for the idler roller to be movable by a manual control between positions of engagement and disengagement with the tape and for the spool carriers to be selectively rotatable by the motor at relatively high speed in either direction with the idler roller in the position of disengagement from the tape, either to effect a rapid rewind of the tape on to the take-off spool or to effect a rapid wind of the tape on to the take-on spool.

It is a principal object of the present invention to provide an improved and simplified arrangement of parts, including a control mechanism for selectively coupling and uncoupling the spool carriers with or from the motor, according as the apparatus is required to record or reproduce or the tape is required to be re-wound rapidly on to the take-off spool or to be wound rapidly on to the take-on spool.

In accordance with the invention an apparatus of the kind referred to above is provided comprising a pair of oppositely rotating pulleys driven by the motor, a take-off spool carrier and a take-on spool carrier each mounted in a movable bearing so as to be movable into and out of engagement with a respective one of said pulleys, a control member coupled with lost mostion with the movable bearings of the two spool carriers, spring means biasing the spool carriers in opposite directions relative to the control member and each towards a related one of said pulleys, the arrangement being such that in either one of two alternative terminal positions of the control member one of the spool carriers is held by the spring bias in yielding driving pressure engagement with one of the pulleys and the other spool carrier is held by the control member and in opposition to the spring bias from driving engagement with the other of said pulleys, and in an intermediate position of the control member both spool carriers are held by the control member and in opposition to their spring bias from driving engagement with either of the said pulleys.

The idler roller may be carried by a spindle mounted upon a rocking lever, and a hand operated control post may be provided common to the above described control member and the rocking lever, whereby the control member may be moved into the above described intermediate position simultaneously with movement of the rocking lever to effect pressure engagement of the tape with the capstan spindle through the idler roller, and into either one of the above described terminal positions with retention of the idler roller in the position disengaged from the tape, following movement by the manual control to rock the rocking lever into the position for disengaging the idler roller from the tape.

The invention is illustrated by way of example in the accompanying drawings in which.

Figure 6:
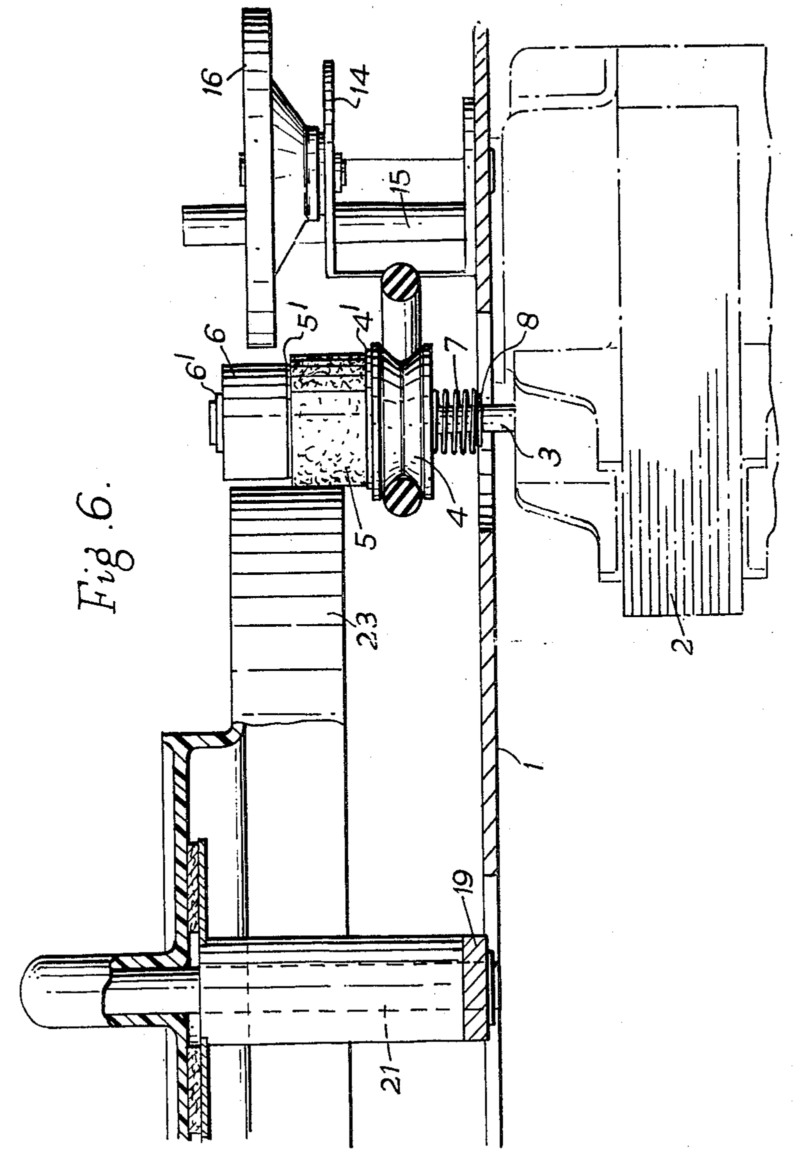
FIG. 6 is a front sectional elevational view on a larger scale taken on the line VI—VI of FIG. 2 showing the arrangement of the drive pulleys for the spool carriers.

Referring to the drawings, the apparatus shown comprises a base plate 1 having an electric driving motor 2 suspended from its underside, the spindle 3 of the motor extending vertically upwards and carrying above the base plate 1 a belt pulley 4 (FIG. 6) surmounted by a friction pulley 5 of rubber or like material and a further friction pulley 6 of metal such as brass and of smaller diameter than the pulley 5. Friction washers 4′ and 5′ are provided respectively between the belt pulley 4 and the friction pulley 5 and between the friction pulleys 5 and 6. The pulleys 4, 5 and 6 are free upon the spindle 3 and the upper friction pulley 6 abuts a circlip 6′ provided at the upper end of the spindle 3 and the three pulleys 4, 5 and 6 are held, together with the frictional washers 4′ and 5′ in frictional driving engagement by a compression spring 7 provided between the underside of the belt pulley 4 and a circlip 8 on the spindle 3.

The assembly of belt pulley 4, friction pulley 5, friction pulley 6 and the friction washers 4′ and 5′ all carried on the motor spindle 3 and normally rotated thereby in unison constitutes the first of the aforementioned pair of oppositely rotating pulleys driven by the motor.

Figure 5:
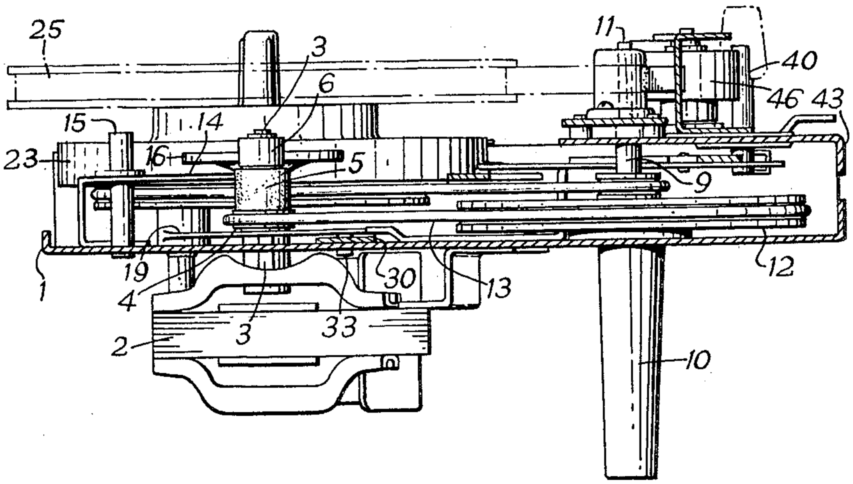
FIG. 5 is a view in sectional end elevation taken on the line V—V of FIG. 4.

In an elongated bearing sleeve 10 (FIG. 5) fixed beneath the base plate 1 is mounted a vertical spindle 9 with its upper end extending above the base plate, the upper part 11 of this upper end constituting the capstan spindle.

On the spindle 9 below the upper end 11 is fixedly mounted a flywheel 12 having a grooved periphery for engagement by a belt 13 engaged with the belt pulley 4 on the motor spindle 3.

On the base plate 1 is mounted a bearing member 14 capable of limited free swinging movement about a vertical pivot 15, this bearing member supporting an idler wheel 16 of rubber or the like capable of moving into or out from contact with one side of the upper friction pulley 6 on the spindle 3, and this idler wheel 16 constitutes the aforementioned second friction pulley rotatable by the motor 2, being rotatable through the first pulley 6 and with reversal of direction.

On fixed vertical pivot pins 17 and 18 on the base plate 1 and on opposite sides of the pair of friction pulleys 6 and 16 (FIGS. 2, 3 and 4) are mounted two similar levers 19 and 20 and in bearings in these levers are rotatably mounted the two axial spindles 21 and 22 of the carriers 23 and 24 for the tape "take-off" spool 25 and "take-on" spool 26 respectively.

On the spindle 22 of the carrier 24 for the take-on spool 26 and below that carrier is freely mounted a disc 27 driven by a belt 28 from a pulley 29 fixed on the capstan spindle 11 and the carrier 24 for the "take-on" spool 26 rests with friction on the disc 27, usually with the interposition of a felt washer or the like (not shown), so that the carrier 24 and the take-on spool 26 thereon can be driven when necessary from the capstan spindle 11 and with some degree of slip.

A control member in the form of a straight bar 30 having a pair of spaced elongated slots 31 and 32 extends between the free ends of the levers 19 and 20, pins or projections 33 and 34 on the undersides of the levers engaging in the respective elongated slots 31 and 32.

Two tension springs 35 and 36 are connected between the levers 19 and 20 and the bar 30, urging the free ends of the levers towards one another about their pivots 17 and 18 and the pins or projections 33 and 34 therein towards those ends of the two elongated slots 31 and 32 which are adjacent or closest to one another.

The control bar 30 is movable substantially longitudinally of itself by means of a rocking lever 37 pivoted at 38 on the base plate 1 and pivotally connected at one end as shown at 39 to the bar 30, the lever 37 itself being rocked by a hand operated control post 40 engaging in a slot 41 (FIGS. 3 and 4) in the rocking lever 37.

The hand-operated control post 40 is movable in all parts of a T-shaped slot 42 in a bridge piece 43 disposed over the slotted end of the rocking lever 37 and movements of the control bar 30 are effected by movements of the control post 40 on the cross portion of the T-shaped slot 42. The control bar 30 remains unaffected by movement of the control post 40 in the stem portion of the T-shaped slot 42.

On the base plate 1 is pivotally mounted an elongated plate 44 for rocking movement about a fixed vertical pivot 45 at one end and on this plate 44 is carried a vertical spindle for the tape-pressing idler roller 46 of rubber or other elastic material, the spindle of the roller 46 being capable of limited movement parallel to itself and relative to the plate 44 and being biased by a spring 47 towards the capstan spindle 11.

The elongated plate 44 is slotted at 48 for the passage of the control post 40 and is moved about its pivot 45 by to and fro movement of the control post 40 in the stem portion of the T-shaped slot 42.

Figure 1:
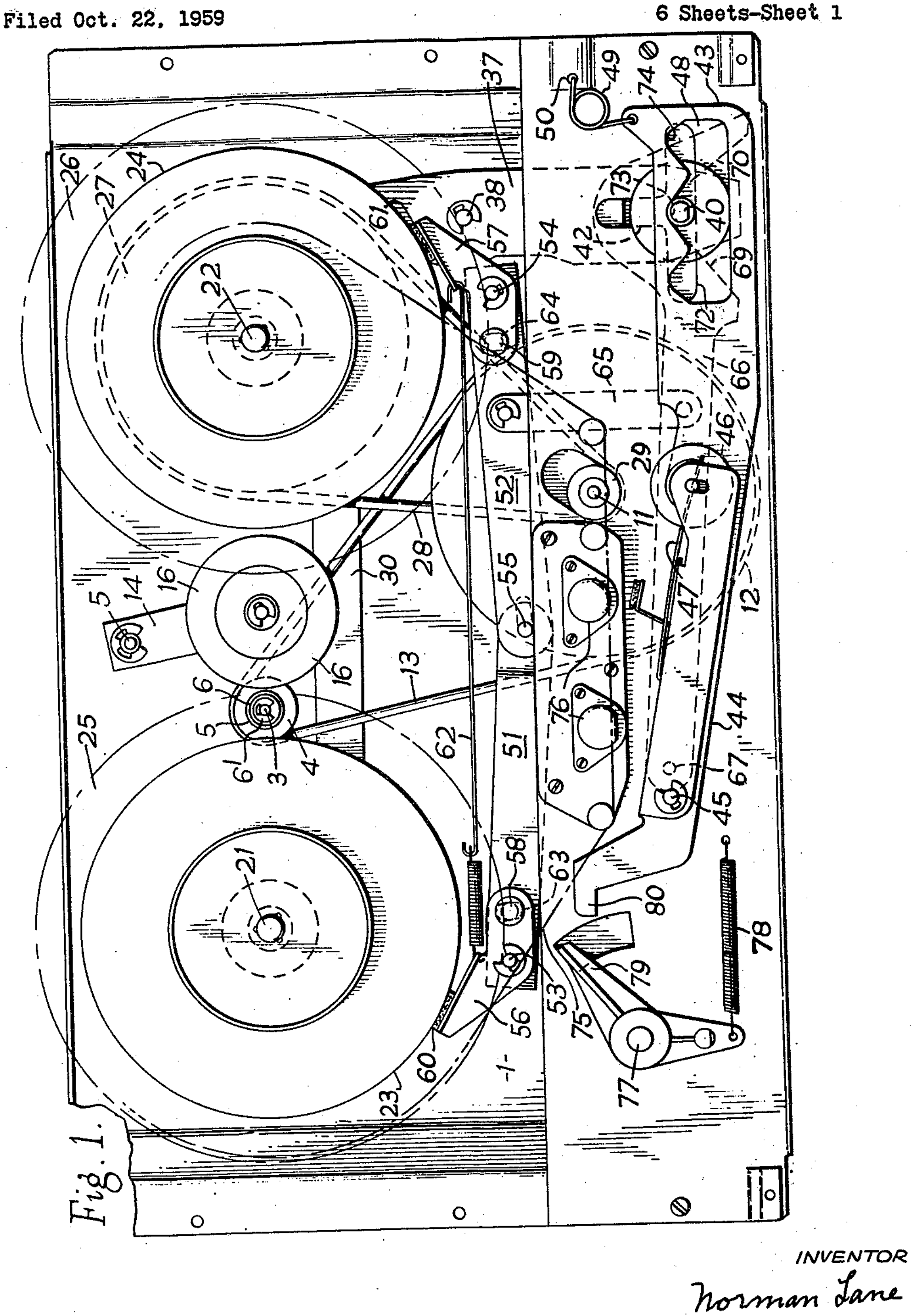
FIG. 1 is a plan view of the complete machine with the parts in the position of rest.
Figure 2:
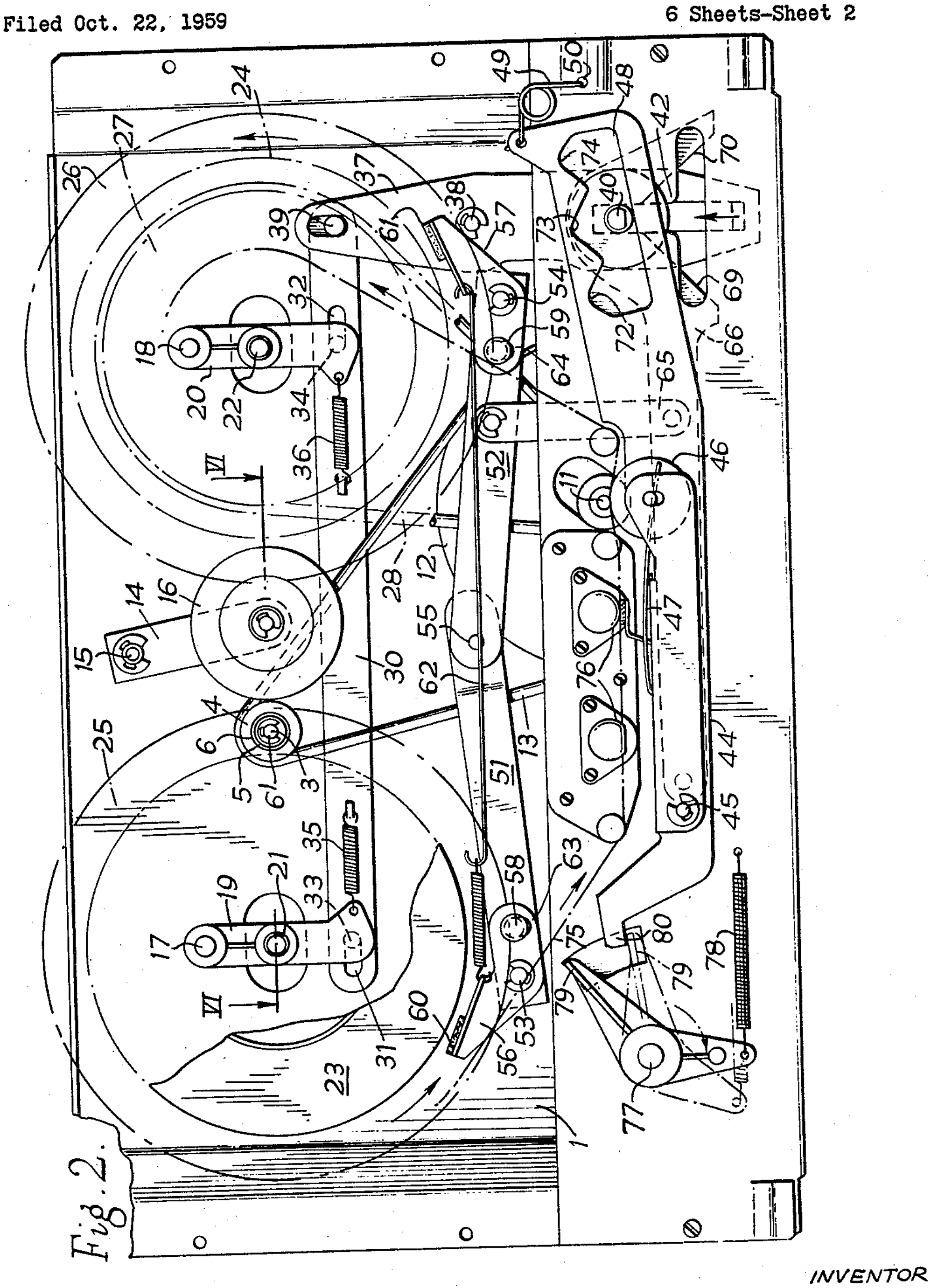
FIG. 2 is a view generally similar to FIG. 1 but with the parts in the position for recording or reproducing.

A toggle or snap-over spring 49 is provided between the free end of the plate 44 and a fixed anchorage 50 on the base plate whereby movements of the plate 44 between the inoperative position of FIG. 1 and the operative position of FIG. 2 take place with snap action.

Braking means for the spool carriers 23 and 24 are provided also for operation in response to movement of the control post 40.

The braking means comprises two links 51 and 52 pivoted respectively on posts at 53 and 54 on the base plate 1, the links extending in the general direction parallel to the control bar 30 and being pin-and-slot connected with one another as shown at 55, for movement in unison about their pivots 53 and 54. At the free ends of the links are carried brake shoes 56 and 57 also pivotally mounted on the pivot posts 53 and 54 and in position for braking engagement of friction pads 60 and 61 on the shoes with the peripheries of the spool carriers 23 and 24.

The friction pads 60 and 61 on the brake shoes 56 and 57 are spaced by a distance slightly greater than the distance between the axes 21 and 22 of the spool carriers and the shoes 56 and 57 are connected by a spring tension rod 62 urging the shoes about their pivots 53 and 54 in the direction towards engagement of the pads 60 and 61 with the spool carriers, the extent of movement of the shoes 56 and 57 under the pull of the tension rod 62 and relative to the links 51 and 52 being limited by engagement of the edges of clearance holes 63 and 64 in extensions of the shoes with upstanding posts 58 and 59 of the links.

A link 65 extends between one of the brake links, 52 in the case illustrated, and a slotted lever 66 (FIG. 4), the lever 66 being pivoted to the base plate 1 at 67 and the slot 68 therein being capable of registration with the slot 41 in the control bar operating lever 37 and the stem of the T-shaped slot 42, and the entry end of the slot 68 in the lever 66 having divergent sides 69, 70 forming cam surfaces for engagement by the control post 40 when it is moved in either direction in the cross piece of the T-shaped slot.

The slotted lever 66 is biased about its pivot 67 by the spring rod 62 connected between the brake shoes 56 and 57 and in the direction tending to apply the brakes to the spool carriers 23 and 24.

One edge of the slot 48 in the pressure-roller-carrying plate 44 is notched to provide three recesses 72, 73, 74 for engagement with the control post 40 and these recesses serve in conjunction with the toggle spring 49 to restrain the control post 40 against inadvertent movement from any one of three positions it may occupy in the cross-piece of the T-shaped slot.

The operation is as follows:

In the rest condition of the machine shown in FIG. 1 the control post 40 is located at the centre of the cross-piece of the T-slot 42 and in engagement with the centre recess 73 of the slot 48 in the pressure-roller-carrying plate 44. In this position the control bar 30 is held by the control post 40 and the lever 37 in its intermediate position, i.e. the same position as is shown in FIG. 2, in which the pins or projections 33 and 34 on the levers 19 and 20 providing the spool carrier bearings 21 and 22 are engaged with the adjacent ends of the slots 31 and 32 in the control bar 30 under the pull of their biasing springs 35 and 36 so that both of the spool carriers 23 and 24 are held in a position out of engagement from the motor driven pulleys 5 and 16, the pivoted plate 44 carrying the pressure roller 46 is held by the control post 40 in the position in which the pressure roller is away from the capstan spindle 11 and the brake controlling slotted lever 66 and the links 51 and 52 are held by the spring rod 62 in the brakes-on position so that the spool carriers 23 and 24 are held stationary.

Tape spools 25 and 26 are applied to the carriers 23 and 24 with the tape loop extending between them and indicated by 75, passed between the capstan spindle 11 and the pressure roller 46 and adjacent the fixed magnetic transducer head or heads of conventional form indicated at 76 in FIGS. 1 and 2.

To record or reproduce, the control post 40 is moved in the part of the T-shaped slot 42 constituting the stem of the T, i.e. upwards from the position of FIG. 1 to that of FIG. 2, the control post 40 engaging the end of the slot 68 in the pivoted brake control lever 66 to move said lever against the biasing spring rod 62 and thereby move the pivoted brake bars 51 and 52 to remove the brake pads 60 and 61 from the spool carriers 23 and 24. As this movement of the control post 40 takes place the pivoted plate 44 is rocked by the control post 40 until its toggle spring 49 takes over to move the plate 44 with snap action to cause the pressure roller 46 to press the tape 75 into engagement with the rotating capstan spindle 11.

During this movement of the control post 40 the lever 37 and the control bar 30 remain unmoved so that the spool carriers 23 and 24 remain disengaged from the motor driven pulleys 5 and 16.

Under these conditions the tape is moved by the capstan spindle 11 at the required constant speed and is drawn freely from the take-off spool 25 by the pull of the tape and wound on to the take-on spool 26 by the drive of the pulley 29 on the capstan spindle 11, the belt 28 and of the slipping clutch between the disc 27 and the underside of the carrier 24, and the required recording or reproduction can take place.

Figure 3:
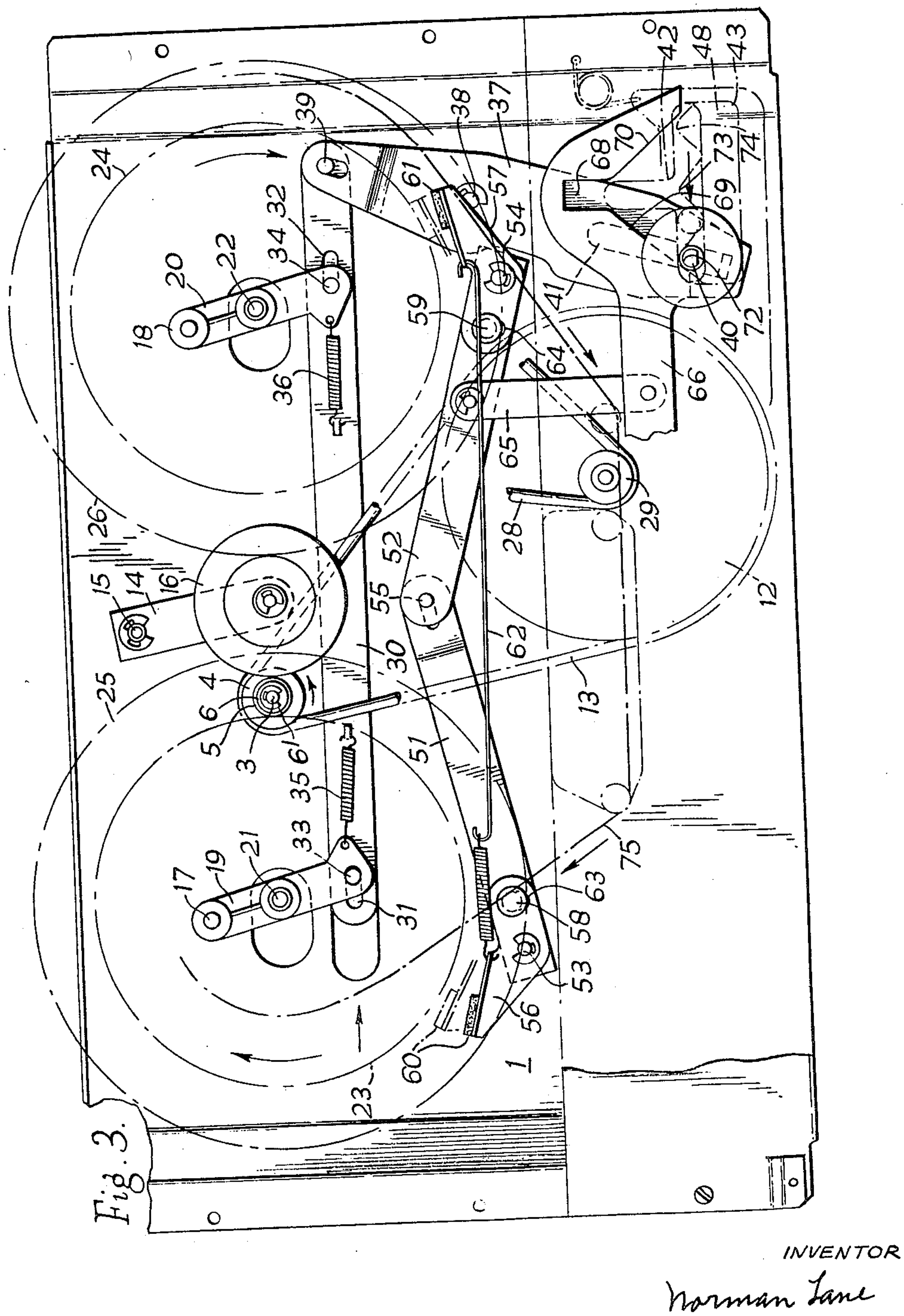
FIGS. 3 and 4 are plan views with some parts omitted, the parts shown being in the position for rapid rewind on to the take-off spool and rapid wind on to the take-on spool respectively.
Figure 4:
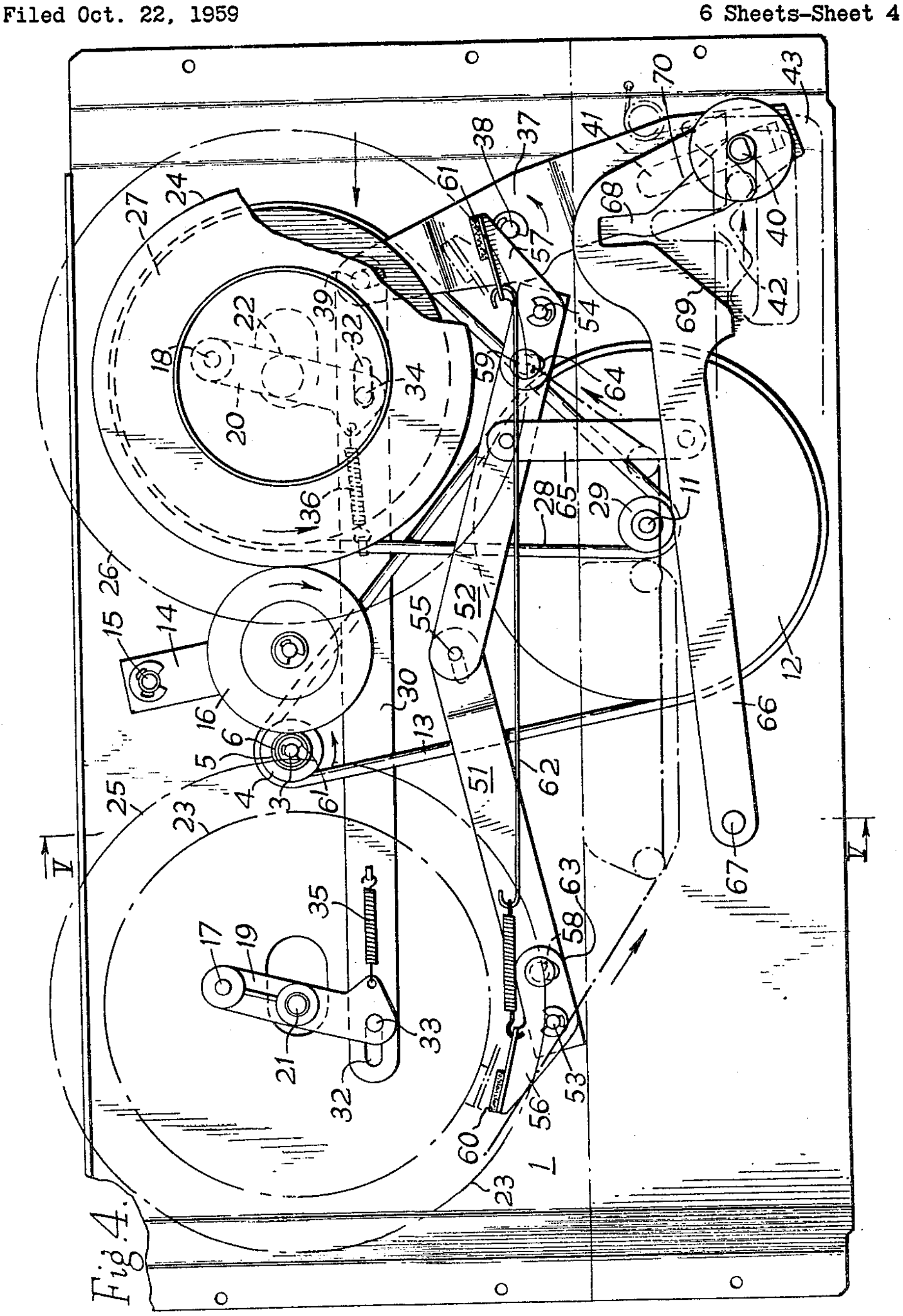

To effect a rapid rewind of the tape 75 on to the take-off spool 25, the control post 40 is first returned to the above described rest position shown in FIG. 1 so that the brakes are applied to the spool carriers 23 and 24 and the pressure roller 46 moved away from the capstan spindle 11 and thereafter the control post 40 is moved in one direction, in the present case to the left, in the cross-piece of the T-shaped slot 42 to the position shown in FIG. 3.

During this movement the pivoted plate 44 carrying the pressure roller 46 is only momentarily affected as the post 40 moves from the recess 73 to recess 72 and the tape 75 remains free of the capstan spindle 11.

The control post 40 however during this movement engages the divergent side 69 of the entry end of the slot in the brake control lever 66 and this lever is moved to thrust upon the link 65 and rock the brake bars 51 and 52 to disengage the brake pads 60 and 61 from the carriers 23 and 24.

The control post 40 also engages one side of the slot 41 of the control-bar-operating lever 37 and the control bar 30 is moved in the direction, in this case to the right, to release the take-off spool carrier bearing lever 19 from the restraint due to the engagement of the pin or projection 33 on the lever 19 with one end of the slot 31 in the control bar 30, and the lever 19 is pulled by its biasing spring 35 in the direction to engage the edge of the take-off spool carrier 23 with the first motor driven pulley 5, whilst the take-on spool carrier 24 is moved in the same direction by the engagement of the pin or projection 34 on its bearing lever 20 by the end of the other slot 32 in the control bar 30.

Thus the take-off spool 25 is driven rapidly by the motor-driven pulley 5 to rewind tape from the take-on spool 26, the latter rotating idly under the pull of the tape against the slipping clutch between the carrier 24 of take-on spool 25 and the disc 27 which serves to restrain over-run by the carrier 24 and spool 26. The second pulley 16 remains stationary or free to rotate idly with pulley 5.

Return of the control post 40 to the rest position of FIG. 1 permits movement of the brake control lever 66 under the urge of spring tension rod 62 to apply the pads 60 and 61 on the brake shoes 56 and 57 to the respective spool carriers to stop their rotation, and rocks lever 37 to move the control bar 30 to its intermediate position thus returning the take-off spool carrier 23 to the position in which it is dis-engaged from the pulley 5.

Movement of the control post 40 in the reverse direction i.e. to the right in the cross piece of the T-slot 42, engages the control post with the other divergent side 70 of the entry to the slot 68 in the brake control lever 66 and again the brake pads 60 and 61 are disengaged from the spool carriers 23 and 24. The control post 40 in this case engages the other side of the slot in the control lever 37 so that the control bar 30 is moved in the reverse direction to that previously considered i.e. to the left and the take-on spool carrier 24 is permitted to engage the second motor driven pulley 16 and urge it against pulley 6 rotating with pulley 5, whilst the take-off spool carrier 23 is moved by the engagement of the end of the slot 31 with pin 33 to a position further away from the pulley 5.

Thus the take-off spool 26 will now be driven rapidly in the normal take-on direction, the tape being drawn freely from the take-off spool 25, the pressure roller 46 still being in the position away from the capstan spindle 11.

The motor-driven pulleys 5, 6 and 16 being aligned between the spool carriers 23 and 24 and the brake pads 60 and 61 being spaced by a distance greater than that between the spool carrier axes 21 and 22 and symmetrically disposed, that spool carrier which is moved into contact with a motor-driven pulley 5 or 16 becomes further spaced from the related brake pad 60 or 61 whilst the other spool carrier is moved nearer to its related brake pad.

With this arrangement it is ensured that braking by one of the pads 60 or 61 takes effect upon whichever of the two spool carriers 23 or 24 is trailing after rapid rewind or rapid wind-on, at a short interval preceding braking of the other carrier, so that the spools 25 and 26 are brought to rest with the loop of tape between them tensioned.

It is common in tape recorders and reproducers to provide a switch to control the record erasure circuit.

Such a switch (not shown) may be provided in the machine according to the present invention.

In the drawings (FIGS. 1 and 2) the control spindle of the switch is shown at 77.

In accordance with a further feature of the invention a spring 78 is provided to urge the switch into the non-erase position, in conjunction with a latch device formed by the end 79 of a switch control lever and a tooth 80 on the end of the pivoted plate 44 mounting the pressure roller.

When a record is to be made the switch control lever is moved to bring the switch into the erase position shown in dotted lines in FIG. 2, and is held in that position while the control post 40 is operated to bring the pressure roller 46 into pressure engagement with the tape and the capstan spindle 11, the tooth 80 on the pivoted plate 44 then making retaining engagement with the end 79 of the switch control lever, so that the switch remains in the erase position and the tape is subjected to erasure before it reaches the recording head whilst recording is taking place.

Upon the next movement of the control post 40 and the rocking plate 44 to the neutral or rest position the tooth 80 is disengaged from the end 79 of the switch control lever and the switch is moved by the spring 78 to the non-erase position in preparation for the next movement of the control post 40 and plate 44 to the position for reproduction of the recording.

I claim:

1. Sound recording and reproducing apparatus of the kind utilizing a magnetic tape movable in both directions between two rotatable spools, said apparatus comprising a driving motor including a driving spindle, a first friction pulley mounted on said driving spindle, a second and reversing friction pulley driven by said first friction pulley, two rotatable spool carriers mounted one at each side of the pulley assembly comprising said first friction pulley and said second and reversing friction pulley and rotatable together in the same direction both clockwise and counter-clockwise, two movable bearing members each carrying one of said spool carriers for movement in their own planes of rotation towards and away from the said pulley assembly, a longitudinally movable hand-operated control bar having a pin-and-slot connection with each of said bearing members, spring means biasing said two bearing members and the said spool carriers carried thereby towards one another and towards the said pulley assembly between said spool carriers, the arrangement being such that the spool carriers are moved simultaneously and in the same direction by movements of the control bar between two terminal positions in which one of the said spool carriers is held by said spring biasing means in yielding driving pressure engagement with one of the pulleys of the said pulley assembly and the other spool carrier is held by the control bar in opposition to said spring biasing means away from driving engagement with the other pulley of said pulley assembly and an intermediate position in which both said spool carriers are held in opposition to said spring biasing means out of driving contact with either of the pulleys of said pulley assembly.

2. Apparatus according to claim 1, wherein the second and reversing friction pulley is rotatable about an axis parallel to said driving spindle and the two rotatable spool carriers are mounted one at each side of the pulley assembly comprising said first friction pulley and said second and reversing friction pulley for rotation about axes parallel to said driving spindle and substantially in a single plane containing the axis of said driving spindle.

3. Apparatus according to claim 1, wherein the second and reversing friction pulley is rotatable about an axis parallel to said driving spindle, and the two rotatable spool carriers are mounted one at each side of the pulley assembly comprising said first friction pulley and said second and reversing friction pulley for rotation about axes parallel to said driving spindle and substantially in a single plane containing the axis of said driving spindle and the axis of said second friction and reversing pulley.

4. Apparatus according to claim 1, wherein said bearing members are formed by levers having fixed pivots at one end, bearings carrying the spool carriers intermediate the ends of said levers, and the said pin-and-slot connections with the said longitudinally movable hand-operated bar at the other end of said levers.

5. Sound recording and reproducing apparatus as claimed in claim 1 and including braking means comprising a pair of brake operating links movable about fixed pivots on a line substantially parallel to a line joining the axes of the said two spool carriers, said links being connected with one another for movement in unison, a pair of brake shoes pivoted on the fixed pivots of the said links and capable of limited movement about said pivots relative to said links, said shoes being spaced from one another by a distance greater than that between the axes of the said two spool carriers and less than that between the remote points on the peripheries of the said two spool carriers, spring means urging the said brake shoes about their pivots towards limiting positions relative to the said links and towards their braking position, and hand-controlled means controlling said longitudinally movable control bar and said pair of brake-operating links and moving said brake-operating links between the brake-on and the brake-off positions and vice versa while said control bar is stationary in said intermediate position, and moving said brake-operating links from a brake-on position to a brake-off position and substantially simultaneously the control bar in a selected direction longitudinally of itself to effect driving engagement of one of the two spool carriers with one of the friction pulleys of the said pulley assembly, the arrangement being such that during rapid re-wind or wind-on the spacing between one of said brake shoes and that one of the said two spool carriers which is in driven contact with one of the friction pulleys of said friction pulley assembly is greater than the spacing between the other brake shoe and the other of said two spool carriers not in driving contact with a friction pulley of said friction pulley assembly and contact between the said other brake shoe and said other of said two spool carriers takes place prior to contact between said one of said brake shoes and that one of said two spool carriers which is in driven contact with one of the friction pulleys of said friction pulley assembly when the brake operating links are operated in unison to brake the apparatus.

6. Apparatus according to claim 1, and comprising a friction clutch between the said driving spindle and the said first friction pulley mounted on said driving spindle.

7. Sound recording and reproducing apparatus of the kind utilizing a magnetic tape movable in both directions between two rotatable spools, said apparatus comprising a driving motor including a driving spindle, a first friction pulley mounted on said driving spindle, a second and reversing friction pulley driven by said first friction pulley, two rotatable spool carriers mounted one at each side of the pulley assembly comprising said first friction pulley and said second and reversing friction pulley and rotatable together in the same direction both clockwise and counterclockwise, two movable bearing members each carrying one of said spool carriers for movement in their own planes of rotation towards and away from the said pulley assembly, a longitudinally movable hand-operated control bar having two slots each connected with a pin on each of said bearing members, tension springs connected between each one of said bearing members and the said control bar biasing the said two bearing members and the spool carriers carried thereby towards the said pulley assembly between said spool carriers, the arrangement being such that the spool carriers are moved simultaneously and in the same direction by movements of the control bar between two terminal positions in which one of the said spool carriers is held by its related one of said tension springs in yielding driving pressure engagement with one of the pulleys of the said pulley assembly and the other spool carrier is held by the control bar in opposition to its related one of said tension springs away from driving engagement with the other pulley of said pulley assembly and an intermediate position in which both said spool carriers are held in opposition to their said tension springs out of driving contact with either of the pulleys of said pulley assembly.

References Cited in the file of this patent

UNITED STATES PATENTS

| | | |
|---|---|---|
| 2,647,435 | Nemeth | Aug. 4, 1953 |
| 2,668,674 | Roberts | Feb. 9, 1954 |
| 2,729,079 | Kuehn | Jan. 3, 1956 |
| 2,741,439 | Dale et al. | Apr. 10, 1956 |
| 2,813,686 | Schroter | Nov. 19, 1957 |
| 2,877,958 | Moore et al. | Mar. 17, 1959 |
| 2,920,148 | Munroe | Jan. 5, 1960 |